(12) United States Patent
Zhang et al.

(10) Patent No.: US 11,073,957 B2
(45) Date of Patent: Jul. 27, 2021

(54) TOUCH PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Guiyu Zhang, Beijing (CN); Hongqiang Luo, Beijing (CN); Yichen Jiang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/910,814

(22) Filed: Jun. 24, 2020

(65) Prior Publication Data
US 2021/0191568 A1   Jun. 24, 2021

(30) Foreign Application Priority Data

Dec. 19, 2019 (CN) .......................... 201911323070.X

(51) Int. Cl.
*G06F 3/044* (2006.01)
(52) U.S. Cl.
CPC .......... *G06F 3/0446* (2019.05); *G06F 3/0443* (2019.05); *G06F 2203/04107* (2013.01)

(58) Field of Classification Search
None
See application file for complete search history.

(56) References Cited

U.S. PATENT DOCUMENTS

| 10,852,896 B2 * | 12/2020 | Nakayama | ............ G06F 3/0446 |
| 2014/0299357 A1 * | 10/2014 | Nakamura | .............. G06F 3/047 |
| | | | 174/250 |

* cited by examiner

*Primary Examiner* — Duane N Taylor, Jr.
(74) *Attorney, Agent, or Firm* — Westerman, Hattori, Daniels & Adrian, LLP

(57) ABSTRACT a touch panel and a display device are provided, the touch panel includes: a plurality of columns of touch units, each column of touch units includes a plurality of touch units arranged along a first direction, and at least one touch unit in a same column of touch units comprises a plurality of first electrode patterns and a plurality of second electrode patterns arranged in parallel, each of the first electrode patterns and the second electrode patterns has a ribbon shape and extends along the first direction, the plurality of first electrode patterns and the plurality of second electrode patterns are alternately arranged along the second direction, the second direction and the first direction intersect each other, and the first electrode patterns and the second electrode patterns are electrically insulated from each other.

20 Claims, 5 Drawing Sheets

TOUCH PANEL AND DISPLAY DEVICE

CROSS-REFERENCE TO RELATED APPLICATION

This application claims priority of Chinese Patent Application No. 201911323070.X filed on Dec. 19, 2019 in China National Intellectual Property Administration, the disclosure of which is incorporated herein by reference in entirety.

TECHNICAL FIELD

The present disclosure relates to the field of display technology, and in particular, to a touch panel and a display device.

BACKGROUND

The touch panel has been widely used in display devices. Existing display devices (especially OLED (Organic Light Emitting Diode) touch display screens) using touch panels are mostly designed for use under high groundmass conditions. In practice, the user of the display device may use the display device in low groundmass conditions (for example, when a display device such as a mobile phone is placed on a desktop or in bed). In this case, the problem of poor touch effect may occur, especially for a particularly thin and light OLED touch display screen (such as FMLOC (Flexible Multiple Layer On Cell) structure), this kind of problem may be more obvious.

SUMMARY

Some embodiments of the present disclosure provide a touch panel, comprising: a plurality of columns of touch units, each column of touch units comprises a plurality of touch units arranged along a first direction, and at least one touch unit in a same column of touch units comprises a plurality of first electrode patterns and a plurality of second electrode patterns arranged in parallel, each of the first electrode patterns and the second electrode patterns has a ribbon shape and extends along the first direction, the plurality of first electrode patterns and the plurality of second electrode patterns are alternately arranged along the second direction, the second direction and the first direction intersect each other, and the first electrode patterns and the second electrode patterns are electrically insulated from each other.

In some embodiments, in a same touch unit, each first electrode pattern comprises a plurality of first strip sections connected end to end, and each second electrode pattern comprises a plurality of second strip sections connected end to end; the plurality of first strip sections comprises a first set of first strip sections and a second set of first strip sections, the first set of first strip sections is offset relative to the second set of first strip sections in the second direction, and in a same first electrode pattern, the first set of first strip sections and the second set of first strip sections are alternately arranged along the first direction; and the plurality of second strip sections comprises a first set of second strip sections and a second set of second strip sections, the first set of second strip sections is offset relative to the second set of second strip sections in the second direction, and in a same second electrode pattern, the first set of second strip sections and the second set of second strip sections are alternately arranged along the first direction.

In some embodiments, in a same first electrode pattern, an offset amount of the first set of first strip sections relative to the second set of first strip sections in the second direction is a half of an average width of the first strip sections in the first electrode pattern; and/or in a same second electrode pattern, an offset amount of the first set of second strip sections relative to the second set of second strip sections in the second direction is a half of an average width of the second strip sections in the second electrode pattern.

In some embodiments, a first touch area and a second touch area arranged along the first direction are provided in the same touch unit, the plurality of first electrode patterns and the plurality of second electrode patterns are located in the first touch area, a plurality of third electrode patterns and a plurality of fourth electrode patterns arranged in parallel are provided in the second touch area, each of the third electrode patterns and the fourth electrode patterns has a ribbon shape and extends along the first direction, the plurality of third electrode patterns and the plurality of fourth electrode patterns are alternately arranged along the second direction, the third electrode patterns and the fourth electrode patterns are electrically insulated from each other, wherein, a first electrode connection portion is provided at a boundary between the first touch area and the second touch area, the first electrode connection portion extends along the second direction and is electrically connected with the plurality of second electrode patterns and the plurality of fourth electrode patterns.

In some embodiments, the first electrode connection portion is electrically insulated from the plurality of first electrode patterns and the plurality of third electrode patterns.

In some embodiments, the plurality of columns of touch units comprise a first column of touch units and a second column of touch units adjacent to each other, the first column of touch units comprises one touch unit, the second column of touch units comprises another touch unit, and the one touch unit and the another touch unit are arranged in parallel in the second direction, the first electrode connection portion of the one touch unit is electrically connected to the first electrode connection portion of the another touch unit.

In some embodiments, the touch panel further comprising a bridge layer located on a side of the first electrode connection portion away from a touch surface of the touch panel, wherein a second electrode connection portion is provided in the first touch area and a third electrode connection portion is provided in the second touch area, the second electrode connection portion is electrically connected to the plurality of first electrode patterns, the third electrode connection portion is electrically connected to the plurality of third electrode patterns, and the second electrode connection portion and the third electrode connection portion in the same touch unit are electrically connected through the bridge layer.

In some embodiments, the first electrode pattern, the second electrode pattern, the third electrode pattern, the fourth electrode pattern, the first electrode connection portion, the second electrode connection portion and the third electrode connection portion are made of a same material and arranged in a same layer.

In some embodiments, the plurality of touch units in a same column comprise a first touch unit and a second touch unit adjacent to each other, the second touch area of the first touch unit is adjacent to the first touch area of the second touch unit, the fourth electrode pattern in the first touch units are electrically insulated from the second electrode patterns in the second touch unit.

In some embodiments, a fourth electrode connection portion is further provided in the first touch area, the fourth electrode connection portion extends along the second direction and electrically connects the plurality of first electrode patterns and the second electrode connection portion together; and a fifth electrode connection portion is further provided in the second touch area, the fifth electrode connection portion extends along the second direction and electrically connects the plurality of third electrode patterns and the third electrode connection portion together.

In some embodiments, the plurality of touch units in a same column comprise a first touch unit and a second touch unit adjacent to each other, the second touch area of the first touch unit is adjacent to the first touch area of the second touch unit, the fifth electrode connection portion in the second touch area of the first touch unit is electrically connected to the fourth electrode connection portion in the first touch area of the second touch unit.

In some embodiments, two columns of touch units adjacent to each other in the second direction in the plurality of columns of touch units are spaced apart from each other.

In some embodiments, a distance between the adjacent two columns of touch units in the second direction is greater than 30% of an average width of all columns of touch units in the plurality of columns of touch units along the second direction.

In some embodiments, the touch panel further comprising a dummy electrode pattern disposed between the two columns of touch units adjacent to each other in the second direction in the plurality of columns of touch units, the dummy electrode pattern being electrically insulated from the first electrode patterns and the second electrode patterns.

In some embodiments, a width of the dummy electrode pattern in the second direction is greater than 30% of an average width of all the columns of touch units in the plurality of columns of touch units along the second direction.

In some embodiments, the first electrode patterns, the second electrode patterns and the dummy electrode pattern are made of a same material and arranged in a same layer.

Some embodiments of the present disclosure provide a display device comprising: the touch panel of the above embodiments; and a display screen located on a side of the touch panel away from a touch surface.

In some embodiments, widths of each first electrode pattern and each second electrode pattern in the second direction are integer multiple of a width of a display pixel of the display screen in the second direction.

In some embodiments, widths of each first electrode pattern and each second electrode pattern in the second direction are equal to a width of a display pixel of the display screen in the second direction.

In some embodiments, the display screen is a light-emitting diode display screen, and a thin film encapsulation is provided on a side of the display screen facing the touch panel, and the display device further comprises a buffer layer between the display screen and the touch panel.

BRIEF DESCRIPTION OF THE DRAWINGS

In order to more clearly explain the embodiments of the present disclosure or the technical solutions in the prior art, the drawings needed to be used in the description of the embodiments will be briefly introduced below. Obviously, the drawings in the following description are only some embodiments of the present disclosure. For those of ordinary skill in the art, without paying any creative labor, other drawings can also be obtained from these drawings as follows.

DETAILED DESCRIPTION OF EMBODIMENTS

To make the objects, technical solutions, and advantages of the embodiments of the present disclosure more clear, the technical solutions in the embodiments of the present disclosure will be described clearly and completely in conjunction with the drawings in the embodiments of the present disclosure. Obviously, the described embodiments are some, but not all, of the embodiments of the present disclosure. Based on the described embodiments of the present disclosure, all other embodiments obtained by those of ordinary skill in the art without creative efforts fall within the protection scope of the present disclosure. It should be noted that throughout the drawings, the same elements are denoted by the same or similar reference signs. In the following description, some specific embodiments are for descriptive purposes only, and should not be construed as limiting the present disclosure, but are merely examples of embodiments of the present disclosure. When it may cause confusion to the understanding of the present disclosure, conventional structure or configuration will be omitted. It should be noted that shapes and sizes of the components in the figures do not reflect the true sizes and proportions, but only illustrate the contents of the embodiments of the present disclosure.

Unless otherwise defined, the technical terms or scientific terms used in the embodiments of the present disclosure should have a common meaning understood by those skilled in the art. The terms "first", "second" and similar words used in the embodiments of the present disclosure do not represent any order, quantity or importance, but are only used to distinguish different components.

In addition, in the description of the embodiments of the present disclosure, the term "electrically connect" may refer to the direct electrical connection of two components, or may refer to the electrical connection between two components via one or more other components. In addition, the two components may be electrically connected or coupled through wired or wireless means.

Figure 1:
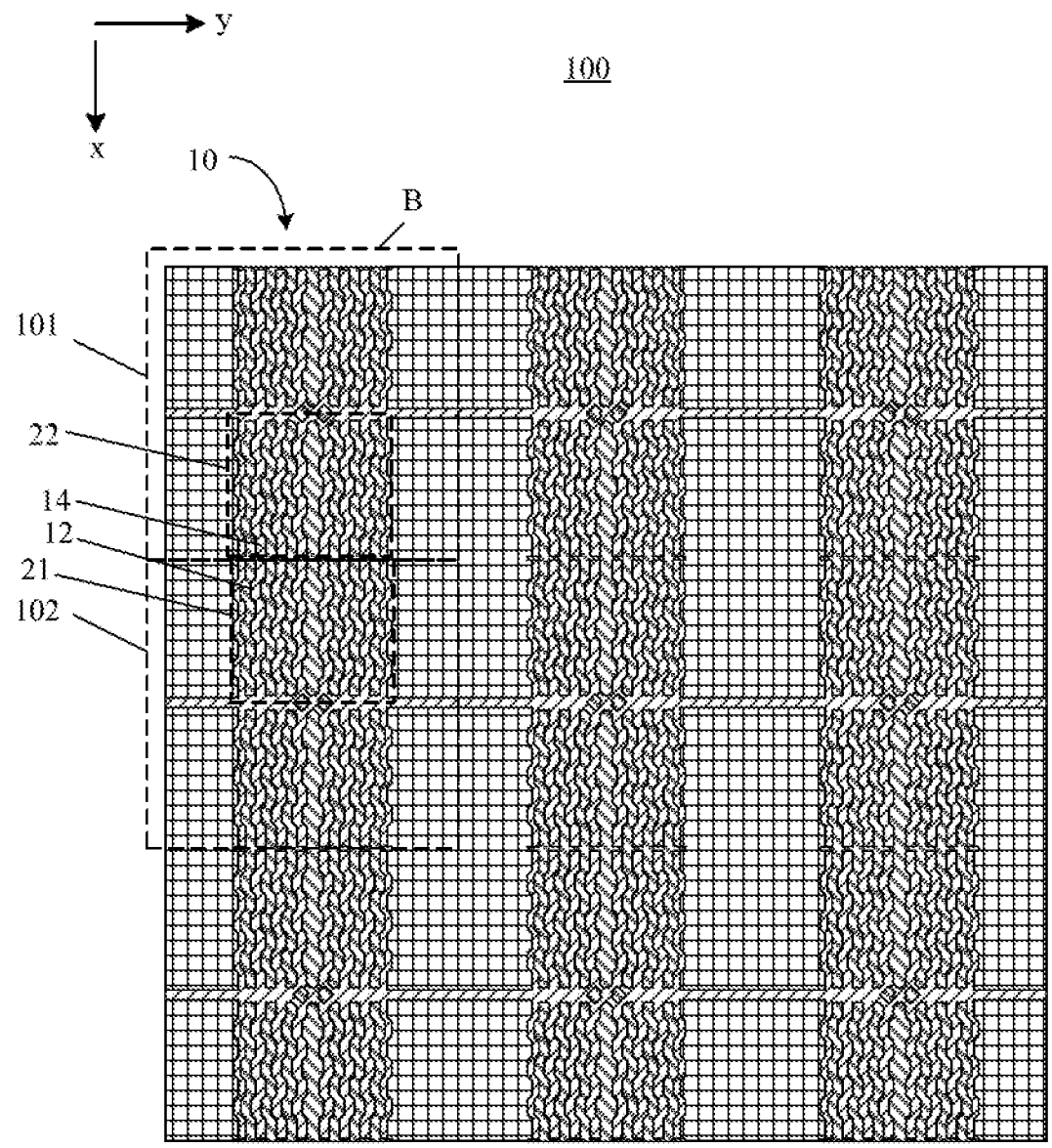
FIG. 1 shows a schematic diagram of a touch panel according to the present disclosure (in which 3×3 touch units are shown).

FIG. 1 shows a top view of a part of a touch panel 100 according to an embodiment of the present disclosure, in which 3×3 touch units is shown. In FIG. 1, three columns of touch units 10 are shown. Each column of touch units includes three touch units 10 arranged along a first direction (for example, the x direction shown in FIG. 1). However, in the embodiment of the present disclosure, the number of columns of touch units is not limited to three columns, and the number of touch units 10 in each column of touch units is also not limited to three. That is, multiple columns of touch units 10 may be provided on the touch panel 100, and each column of touch units 10 may include multiple touch units 10 arranged along the first direction.

Figure 2:
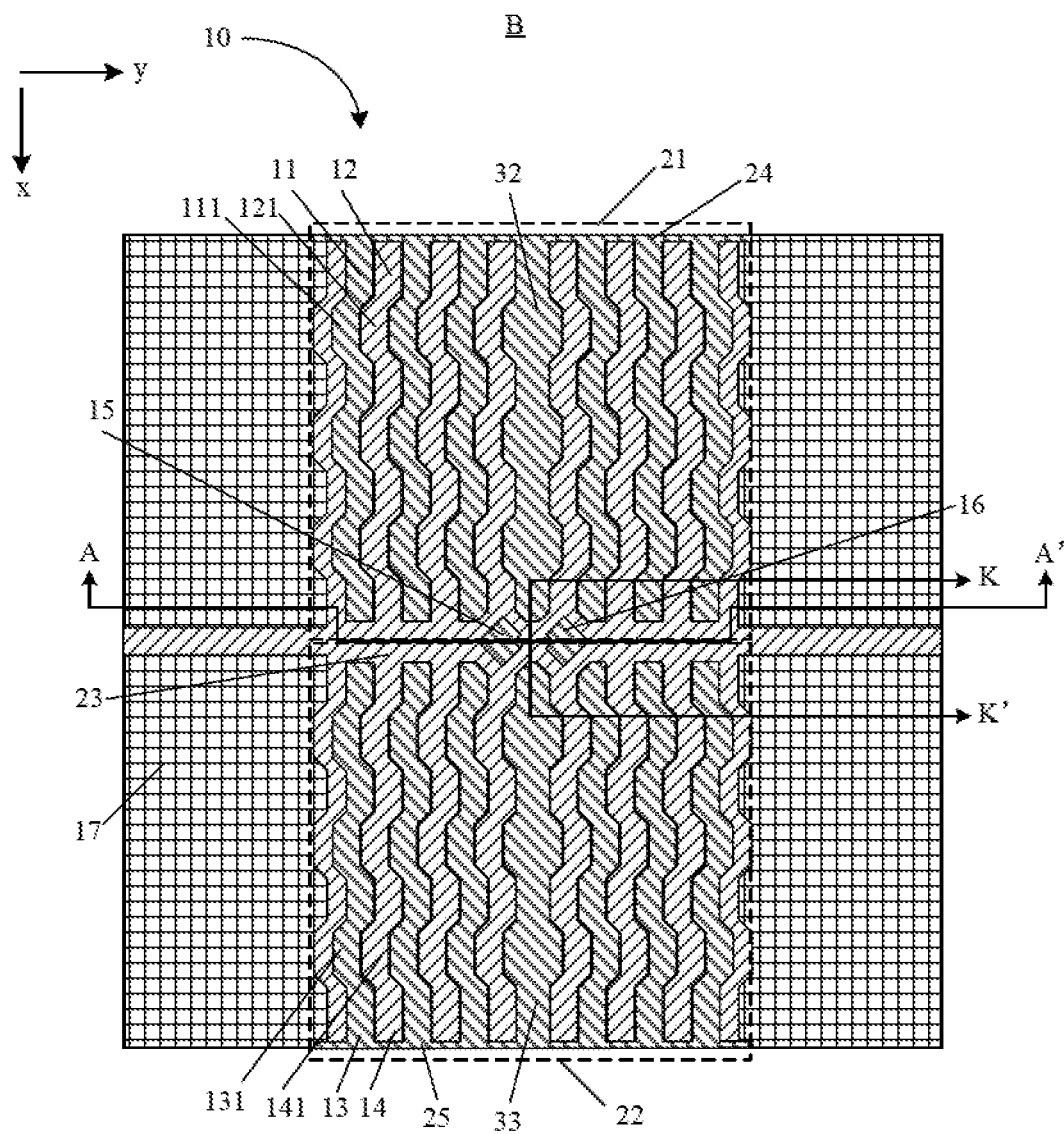
FIG. 2 schematically shows a schematic diagram of a touch unit in a touch panel according to an embodiment of the present disclosure.

FIG. 2 shows an enlarged view of part B in FIG. 1 to more clearly show the structure of a single touch unit 10. As can be seen from FIG. 2, at least one touch unit in the same column of touch units 10 includes a plurality of first electrode patterns 11 and a plurality of second electrode patterns 12 arranged in parallel. The first electrode pattern 11 and the second electrode pattern 12 both have a ribbon shape and extend along a first direction (the x direction shown in FIGS. 1 and 2), and the plurality of first electrode patterns 1 and the plurality of second electrode patterns 12 are alternately arranged along the second direction (the y direction shown in FIGS. 1 and 2), and the second direction and the first direction intersect each other (for example, perpendicular to each other). The first electrode pattern 11 and the second electrode pattern 12 are electrically insulated from each other. In some embodiments, the first electrode pattern 11 may be a driving electrode (Tx), and the second electrode pattern 12 may be a sensing electrode (Rx).

Figure 4:
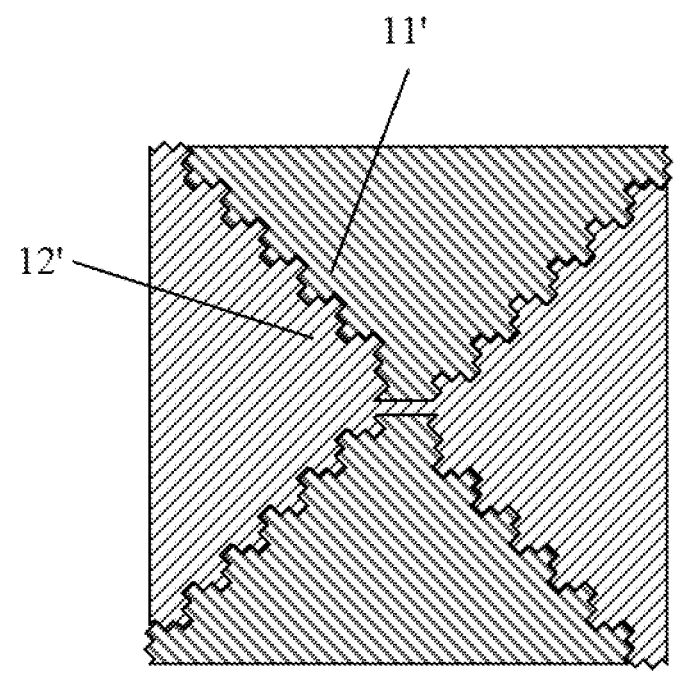
FIG. 4 schematically shows a schematic diagram of a touch unit on an existing touch panel.

This structure is different from the structure of the existing touch unit. For better comparison, FIG. 4 shows a design of a touch unit on a conventional touch panel. As shown in FIG. 4, in this design, the driving electrode (Tx) 11' and the sensing electrode (Rx) 12' are in a block shape (the shape of the driving electrode and the sensing electrode are not completely shown in the figure, the complete pattern of the driving electrode or the sensing electrode may be generally square, for example). In FIG. 4, the area of the driving electrode (Tx) 11' and the sensing electrode (Rx) 12' is relatively large, but the coupling area between the driving electrode (Tx) 11' and the sensing electrode (Rx) 12' is relatively small, so the mutual capacitance between the driving electrode (Tx) 11' and the sensing electrode (Rx) 12' is also small. At the same time, when the finger touches the touch screen, the coupling capacitance between the finger and the driving electrode (Tx) 11' and the sensing electrode (Rx) 12' is also relatively large.

In this design, the change in the mutual capacitance between the driving electrode (Tx) 11' and the sensing electrode (Rx) 12' is an effective touch signal, while excessive coupling capacitance between the finger and the driving electrode (Tx) 11' and the sensing electrode (Rx) 12' may cause strong interference signals. For example, when the touch device is in a low groundmass (LGM) condition, because the coupling capacitance between the finger and the driving electrode (Tx) 11' and the sensing electrode (Rx) 12' is relatively large, the retransmissions effect is relatively high, resulting in a serious decline in touch performance. This effect means that in the case of high grounding, the source of the touch signal is that the power of the touch unit enters the ground through the finger, which causes a difference in the mutual inductance capacitance of the drive electrode (Tx) 11' and the sense electrode (Rx) 12', while in the case of low grounding, there is insufficient power to enter the ground through the finger, so the remaining power will enter other touch channels and become an interference signal to the touch signal. With the emergence of ultra-thin structure products, touch apparatuses (such as mobile phones, tablet computers, etc.) are more and more in a low groundmass (LGM) condition, such as when they are used on an insulated desktop or bed without a power outlet. For the traditional touch unit design, when the design structure is in a low groundmass condition, the touch performance may be significantly reduced, which is undesirable.

In the embodiments of the present disclosure, the first electrode pattern 11 and the second electrode pattern 12 are in a ribbon shape and arranged alternately. In this case, the coupling area between the first electrode pattern 11 and the second electrode pattern 12 is significantly increased. Thereby, the mutual inductance capacitance between the first electrode pattern 11 and the second electrode pattern 12 is increased to improve the strength of the effective touch signal, while the first electrode pattern 11 and the second electrode pattern 12 is changed from a block shape to a strip shape, and the contact area of single first electrode pattern 11 or second electrode pattern 12 and the finger becomes smaller, reducing the capacitance between the finger and the first electrode pattern 11 or the second electrode pattern 12. The above retransmission effect is caused by multi-touch. When two fingers touch the touch panel at two touch points, a certain amount of charge flows between the two touch points from the finger, which is equivalent to a reverse touch interference signal, weakening the actual touch signal. In this regard, the area of the electrode pattern of the finger and the touch unit is reduced, which is beneficial to reduce this effect. Therefore, the above structure in the embodiments of the present disclosure is very helpful for improving the performance of the touch panel under low groundmass conditions.

In some embodiments, as shown in FIG. 2, in the same touch unit 10, each first electrode pattern 11 may include a plurality of first strip sections 111 connected end to end, and each second electrode pattern 12 includes a plurality of second strip sections 121 connected end to end. The plurality of first strip sections 111 includes a first set of first ship sections 111 and a second set of first strip sections 111, the first set of first strip sections 111 is offset relative to the second set of first strip sections 111 in the second direction (they direction shown in FIGS. 1 and 2), and in the same first electrode pattern 11, the first set of first strip sections 11 and the second set of first strip sections 111 are alternately arranged along the first direction (the x direction shown in FIGS. 1 and 2). In the example of FIG. 2, the odd-numbered first strip sections 111 of the first electrode pattern 11 from top to bottom can be regarded as belonging to the first set of first strip sections 111 (for example, the 1st, 3rd, 5th, and 7th first strip sections III from top to bottom), and the even-numbered first strip sections 111 of the first electrode pattern 11 from top to bottom can be regarded as belonging to the second group first strip sections 111 (such as the 2nd, 4th, 6th first strip sections 111 from top to bottom). In the embodiment shown in FIG. 2, the widths of the first strip sections 111 are the same. As can be seen from FIG. 2, the second set of first strip sections 111 of the first electrode pattern 1 is offset to the left compared to the first set of first strip sections 111, and the offset amount is half of the width of the first strip section 111. However, the embodiment of the present disclosure is not limited to this, for example, the even-numbered first strip sections 111 of the first electrode pattern in the example of FIG. 2 from top to bottom may also be regarded as belonging to the first set of first strip sections 111 (for example, the 2nd, 4th, and 6th first strip sections 111 from top to bottom) and the odd-numbered first strip sections 111 from top to bottom of the first electrode pattern 11 can be regarded as belonging to the second set of first strip sections 111 (for example, the 1st, 3rd, 5th, and 7th first strip sections 111 from top to bottom), in this case, the second set of first strip sections 111 of the first electrode pattern 11 is offset to the right compared to the first set of first strip sections 111.

In some embodiments, in the same second electrode pattern 12, the plurality of second strip sections 121 includes a first set of second strip sections 121 and a second set of second strip sections 121, the first set of second strip sections 121 is offset relative to the second set of second strip sections 121 in the second direction, and in the same second electrode pattern 12, the first set of second strip sections 121 and the second set of second strip sections 121 are alternately arranged along the first direction. In the example of FIG. 2, the odd-numbered second strip sections 121 of the second electrode pattern 12 from top to bottom can be regarded as belonging to the first set of second strip sections 121 (for example, the 1st, 3rd, 5th, and 7th first strip sections 121 from top to bottom), and the even-numbered second strip sections 121 of the second electrode pattern 12 from top to bottom can be regarded as belonging to the second set of second strip sections 121 (such as the 2nd, 4th, 6th second strip sections 121 from top to bottom). Similarly, in the embodiment shown in FIG. 2, the widths of the second strip sections 121 are the same. As can be seen from FIG. 2, the second set of second strip sections 121 of the second electrode pattern 12 is offset to the left compared to the first set of second strip sections 121, and the offset amount is half of the width of the second strip section 121. However, the embodiment of the present disclosure is not limited to this, for example, the even-numbered second strip sections 121 of the second electrode pattern 12 in the example of FIG. 2 from top to bottom may also be regarded as belonging to the first set of second strip sections 121 (for example, the 2nd, 4th, and 6th second strip sections 121 from top to bottom) and the odd-numbered second strip sections 121 from top to bottom of the second electrode pattern 12 can be regarded as belonging to the second set of second strip sections 121 (for example, the 1st, 3rd, 5th, and 7th second strip sections 121 from top to bottom), in this case, the second set of second strip sections 121 of the second electrode pattern 12 is offset to the right compared to the first set of second strip sections 121.

In the above design, the offset direction of the first set of first strip sections 11 relative to the second set of first strip sections 111 and the offset direction of the first set of second strip sections 121 relative to the second set of second strip sections 121 are the same (for example, both to the left or to the right). This can make the first strip sections 111 in the first electrode patterns 11 and the second strip sections 121 in the second electrode patterns 12 that are adjacent to each other are alternately arranged with each other. This manner can further increase the mutual capacitance between the first electrode pattern and the second electrode pattern, thereby improving touch performance.

In the embodiments of the present disclosure, it is not required that the first strip sections 111 in the same first electrode pattern 11 or different first electrode patterns 11 have the same width, nor the second strip sections 121 in the same second electrode pattern 12 or different second electrode patterns 12 must have the same width.

In some embodiments, in the same first electrode pattern 11, an offset amount of the first set of first strip sections 111 relative to the second set of first strip sections 111 in the second direction is a half of an average width of the first strip section 111 in the first electrode pattern 11. Similarly, in some embodiments, in a same second electrode pattern 12, an offset amount of the first set of second strip sections relative to the second set of second strip sections in the second direction is a half of an average width of the second strip section in the second electrode pattern. However, the embodiments of the present disclosure are not limited to this, and the above offset amount may also be other numerical values. As an example, in the same touch unit, the offset amount of the first set of first strip sections 111 in the same first electrode pattern 11 relative to the second set of first strip sections 111 in the second direction may be the same as the offset amount of the first set of second strip sections 121 in the same second electrode pattern 12 relative to the second set of second strip sections 121 in the second direction, which is beneficial to maximize the use of the area of the touch unit to set the electrode pattern.

In some embodiments, as shown in FIG. 2, a first touch area 21 and a second touch area 22 are arranged along the first direction (the x direction in FIG. 2) in the same touch unit 10. The abovementioned plurality of first electrode patterns 11 and the plurality of second electrode patterns 12 are located in the first touch area 21, a plurality of third electrode patterns 13 and a plurality of fourth electrode patterns 14 arranged in parallel are provided in the second touch area 22. Similar to the abovementioned first electrode pattern 11 and second electrode pattern 12, the third electrode pattern 13 and the fourth electrode pattern 14 each have a ribbon shape and extend along the first direction, the plurality of third electrode patterns 13 and the plurality of fourth electrode patterns 15 are alternately arranged along the second direction, the third electrode pattern 14 and the fourth electrode pattern 14 are electrically insulated from each other.

The layout of the electrode patterns in the second touch area 22 may take the same or similar form as that in the first touch area 21. In some embodiments, as shown in FIG. 2, in the same touch unit 10, each third electrode pattern 13 may include a plurality of third strip sections 131 connected end to end, and each fourth electrode pattern 14 includes a plurality of fourth strip sections 141 connected end to end. The plurality of third strip sections 131 may include a first set of third strip sections 131 and a second set of third strip sections 131, the first set of third strip sections 131 is offset relative to the second set of third strip sections 131 in the second direction (for example, the y direction shown in FIGS. 1 and 2). In the same third electrode pattern 13, the first set of third strip sections 131 and the second set of third strip sections 131 are alternately arranged along the first direction (for example, the x direction shown in FIGS. 1 and 2). In the example of FIG. 2, the odd-numbered third strip sections 131 of the third electrode pattern 13 from top to bottom can be regarded as belonging to the first set of third strip sections 131 (for example, the 1st, 3rd, 5th, and 7th third strip sections 131 from top to bottom), and the even-numbered third strip sections 131 of the third electrode pattern 13 from top to bottom can be regarded as belonging to the second set of third strip sections 131 (such as the 2nd, 4th, 6th third strip sections 131 from top to bottom). In the embodiment shown in FIG. 2, the widths of the third strip sections 131 are the same. As can be seen from FIG. 2, the second set of third strip sections 131 of the third electrode pattern 13 is offset to the left compared to the first set of third strip sections 131, and the offset amount is half of the width of the third strip section 131. However, the embodiment of the present disclosure is not limited to this, for example, the even-numbered third strip sections 131 of the third electrode pattern 13 in the example of FIG. 2 from top to bottom may also be regarded as belonging to the first set of third strip sections 131 (for example, the 2nd, 4th, and 6th third strip sections 131 from top to bottom) and the odd-numbered third strip sections 131 from top to bottom of the third electrode pattern 13 can be regarded as belonging to the second set of third strip sections 131 (for example, the 1st, 3rd, 5th, and 7th third strip sections 131 from top to bottom), in this case, the second set of third strip sections 131 of the third electrode pattern 13 is offset to the right compared to the first set of third strip sections 131.

In some embodiments, in the same fourth electrode pattern 14, the plurality of fourth strip sections 141 include a first set of fourth strip sections 141 and a second set of fourth strip sections 141, the first set of fourth strip sections 141 is offset relative to the second set of fourth strip sections 141 in the second direction. In the same fourth electrode pattern 14, the first set of fourth strip sections 141 and the second set of third strip sections 131 are alternately arranged along the first direction. In the example of FIG. 2, the odd-numbered fourth strip sections 141 of the fourth electrode pattern 14 from top to bottom can be regarded as belonging to the first set of fourth strip sections 141 (for example, the 1st, 3rd, 5th, and 7th fourth strip sections 141 from top to bottom), and the even-numbered fourth strip sections 141 of the fourth electrode pattern 14 from top to bottom can be regarded as belonging to the second set of fourth strip sections 141 (such as the 2nd, 4th, 6th fourth strip sections 141 from top to bottom). Similarly, in the embodiment shown in FIG. 2, the widths of the fourth strip sections 141 are the same. As can be seen from FIG. 2, the second set of fourth strip sections 141 of the fourth electrode pattern 14 is offset to the left compared to the first set of fourth strip sections 141, and the offset amount is half of the width of the fourth strip sections 141. However, the embodiment of the present disclosure is not limited to this, for example, the even-numbered fourth strip sections 141 of the fourth electrode pattern 14 in the example of FIG. 2 from top to bottom may also be regarded as belonging to the first set of fourth strip sections 141 (for example, the 2nd, 4th, and 6th fourth strip sections 141 from top to bottom) and the odd-numbered fourth strip sections 141 from top to bottom of the fourth electrode pattern 14 can be regarded as belonging to the second set of fourth strip sections 141 (for example, the 1st, 3rd, 5th, and 7th fourth strip sections 141 from top to bottom), in this case, the second set of fourth strip sections 141 of the fourth electrode pattern 14 is offset to the right compared to the first set of fourth strip sections 141.

As can be seen from the above, in some embodiments of the present disclosure, the arrangement of the third electrode pattern 13 may be substantially the same as the arrangement of the first electrode pattern 11, and the arrangement of the fourth electrode pattern 14 may be substantially the same as the arrangement of the second electrode pattern 12. For example, the patterns in the second touch area 22 containing the third electrode pattern 13 and the fourth electrode pattern 13 and the patterns in the first touch area 21 containing the first electrode pattern 11 and the second electrode pattern 12 are axisymmetric with respect to the boundary between the first touch area 21 and the second touch area 22, which is advantageous for wiring design. However, the embodiments of the present disclosure are not limited thereto, and the third electrode pattern 13 and fourth electrode pattern 14 may also have different designs from the first electrode pattern 11 and the second electrode pattern 12.

In some embodiments, a first electrode connection portion 23 is provided at a boundary between the first touch area 21 and the second touch area 22, and the first electrode connection portion 23 extends along the second direction (the y direction shown in FIG. 2) and is electrically connected with the plurality of second electrode patterns 12 and the plurality of fourth electrode patterns 14. As an example, the first electrode connection portions 23 in the touch units of adjacent columns are electrically connected to each other. For example, for two adjacent columns of touch units, that is, a first column of touch units and a second column of touch units, one touch unit in the first column of touch units and another touch unit in the second column of touch units are arranged in parallel along the second direction, the first electrode connection portion of the one touch unit and the first electrode connection portion of the another touch unit are electrically connected to each other. In some embodiments, the first electrode connection portion of the one touch unit and the first electrode connection portion of the another touch unit are electrically connected to each other into an integrated structure. In other words, the first electrode connection portion 23 not only electrically connects the second electrode pattern 12 and the fourth electrode pattern 14 in the same touch unit 10, but also serves to electrically connect the second electrode pattern 12 and the fourth electrode pattern 14 in different columns of touch units together. For example, the second electrode pattern 12 and the fourth electrode patterns 14 are used together as the sensing electrode of the touch panel. In some embodiments, the first electrode connection portion 23 is electrically insulated from the plurality of first electrode patterns 11 and the plurality of third electrode patterns 13. For example, the first electrode pattern 11 and the third electrode pattern 13 are used together as the driving electrode of the touch panel. In practice, third electrode patterns 13 and fourth electrode patterns 14 can work with the first electrode patterns 11 and the second electrode patterns 12, respectively, to improve touch performance.

Figure 3:
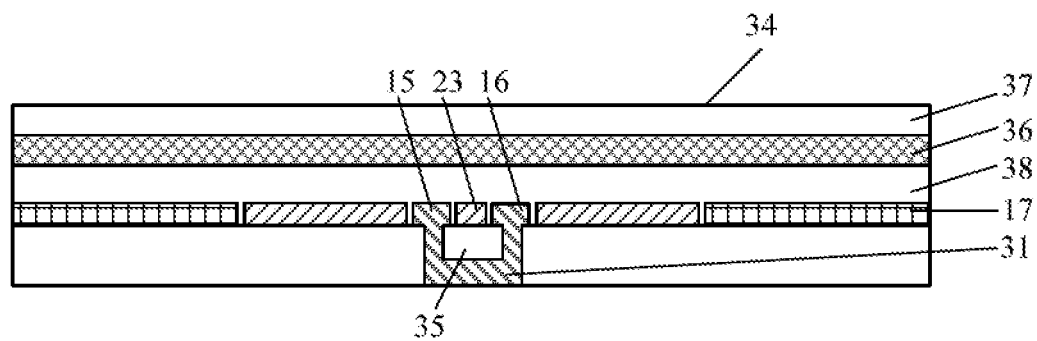
FIG. 3 schematically shows an exemplary cross-sectional view taken along line AA' in FIG. 2.

In some embodiments, the touch panel 100 may further include a bridge layer 31, which is used to electrically connect the first electrode pattern 11 in the first touch area 21 and the third electrode pattern 13 in the second touch area 22 in the same touch unit 10 together. In some embodiments, as shown in FIG. 3, the bridge layer 31 may be located on a side of the first electrode connection portion 23 away from a touch surface 34 of the touch panel 100. The "touch surface" mentioned in the present disclosure refers to a surface on a touch panel for a user to touch to realize a touch operation. A second electrode connection portion 32 is provided in the first touch area 21 and a third electrode connection portion 33 is provided in the second touch area 22, the second electrode connection portion 32 is electrically connected to the plurality of first electrode patterns 11, the third electrode connection portion 33 is electrically connected to the plurality of third electrode patterns 13, and the second electrode connection portion 32 and the third electrode connection portion 33 in the same touch unit 10 are electrically connected through the bridge layer 31.

Figure 5:
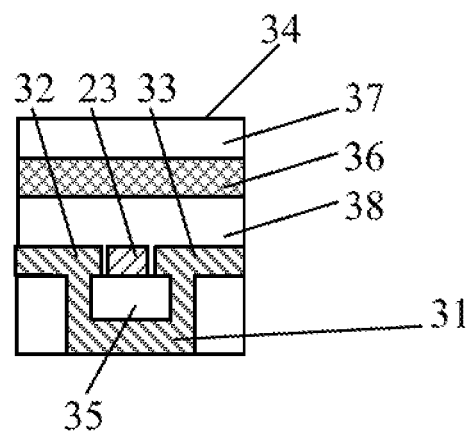
FIG. 5 schematically shows an exemplary cross-sectional view taken along line KK' in FIG. 2, which shows an example where a connection of a bridge layer to a second electrode connection portion and a third electrode connection portion.

FIGS. 3 and 5 schematically show the connection relationship between the second electrode connection portion 32 and the third electrode connection portion 33 and the bridge layer 31. As can be seen from FIG. 5, the orthographic projection of the bridge layer 31 on the touch surface 34 of the touch panel overlaps with the orthographic projection of the second electrode connection portion 32 on the touch surface 34 of the touch panel and overlaps with the orthographic projection of the third electrode connection portion 33 on the touch surface 34 of the touch panel overlaps. This allows the bridge layer 31 to electrically connect the second electrode connection portion 32 and the third electrode connection portion 33 through the via structure, thereby achieving the electrical connection of the first electrode pattern 11 and the third electrode pattern 13. In some embodiments, both the second electrode connection portion 32 and the third electrode connection portion 33 extend along the first direction. In some embodiments, in order to promote the further alternated arrangement of the sensing electrodes and the driving electrodes, as shown in FIGS. 2 and 3, a fifth pattern 15 and a sixth pattern 16 may also be provided in the touch unit 10. On the one hand, the fifth pattern 15 and the sixth pattern 16 are connected to the bridge layer 31 through the via structure; on the other hand, the orthographic projections of the fifth pattern 15 and the sixth pattern 16 on the touch surface 34 of the touch panel are surrounded by the orthographic projection of the first electrode connection portion 23 on the touch surface 34 of the touch panel.

In some embodiments, the first electrode pattern 1, the second electrode pattern 12, the third electrode pattern 13, the fourth electrode pattern 14, the first electrode connection portion 23, the second electrode connection portion 32 and the third electrode connection portion 33 are made of the same material and are arranged on the same layer. The bridge layer 31 is provided to be farther away from the touch surface than the electrode pattern layer (such as the layer where the first electrode pattern 11, the second electrode pattern 12, the third electrode pattern 13, and the fourth electrode pattern 14 are located) can make the electrode pattern layer as close to the touch surface as possible to improve touch performance.

In some embodiments, the touch panel 100 may further include a first insulating layer 35, which is located between the bridge layer 31 and the first electrode connection portion 23 for performing electrical insulation between the two.

In some embodiments, as shown in FIG. 1, the plurality of touch units in the same column may include a first touch unit 101 and a second touch unit 102 adjacent to each other, the second touch area 22 of the first touch unit 101 is adjacent to the first touch area 21 of the second touch unit 102, the third electrode patterns 13 in the first touch unit 101 is electrically connected to the first electrode pattern 11 in the second touch unit 102, and the fourth electrode pattern 14 in the first touch unit 101 is electrically insulated from the second electrode pattern 12 in the second touch unit 102. In some embodiments of the present disclosure, the second electrode pattern 12 and the fourth electrode pattern 14 in the same touch unit are electrically connected to each other (for example, to form a sensing electrode), and the first electrode pattern 11 and third electrode patterns 13 in the same touch unit are electrically connected to each other (for example, to forma driving electrode). The second electrode pattern 12 in one touch unit of the adjacent touch units in the same column is electrically insulated from the fourth electrode pattern 14 in the other touch unit, which can make the sensing electrode obtain different touch signals at different positions on the touch panel so that the position of the touch point can be sensed, which is especially beneficial in multi-touch.

In some embodiments, a fourth electrode connection portion 24 is further provided in the first touch area 21, the fourth electrode connection portion 24 extends along the second direction and electrically connects the plurality of first electrode patterns 11 and the second electrode connection portion 32 together. In the examples shown in FIGS. 1 and 2, the fourth electrode connection portion 24 is located on the side of the first touch area 21 opposite to the first electrode connection portion 23 (the top in FIGS. 1 and 2), which not only electrically connects the first electrode pattern 11 and the second electrode connection portion 32 together, and also serves to separate the second electrode pattern 12 in the current touch unit 10 from the fourth electrode pattern 14 in the touch unit 10 adjacent to the current touch unit 10 in the same column of touch units 10. By separating the second electrode pattern 12 and the fourth electrode patterns 14 of adjacent touch units in the same column of touch units, the touch position of the user's finger can be accurately detected.

In some embodiments, similar to the fourth electrode connection portion 24 in the first touch area 21 described above, a fifth electrode connection portion 25 may be further provided in the second touch area 22, the fifth electrode connection portion 25 extends along the second direction and electrically connects the plurality of third electrode patterns 13 and the third electrode connection portion 33 together. In the examples shown in FIGS. 1 and 2, the fifth electrode connection portion 25 is located on the side of the second touch area 22 opposite to the first electrode connection portion 23 (the bottom in FIGS. 1 and 2), which not only electrically connects the plurality of third electrode patterns 13 and the third electrode connection portion 33 together, and also serves to separate the fourth electrode patterns 14 in the current touch unit 10 from the second electrode pattern 12 in the touch unit 10 adjacent to the current touch unit 10 in the same column of touch units 10. By separating the fourth electrode patterns 14 and the second electrode pattern 12 of adjacent touch units in the same column of touch units, the touch position of the user's finger can be accurately detected.

In some embodiments, both fourth electrode connection portion 24 and fifth electrode connection portion 25 extend along the second direction. In some embodiments, as shown in FIGS. 1 and 2, for the first touch unit 101 and the second touch unit 102 adjacent to each other in the same column of touch units, the second touch area 22 of the first touch unit 101 is adjacent to the first touch area 21 of the second touch unit 102, and the fifth electrode connection portion 25 in the second touch area 22 of the first touch unit 101 and the fourth electrode connection portion 24 in the first touch area 101 of the second touch unit 102 are electrically connected, for example, the two are an integral structure.

In some embodiments, two columns of touch units 10 adjacent to each other in the second direction in the plurality of columns of touch units 10 are spaced apart from each other. For example, the distance between two adjacent columns of touch units in the second direction is greater than 30% of the average width (along the second direction) of all the columns of touch units in the plurality of columns of touch units. Sufficient distance between two adjacent columns of touch units, for example, 30% to 50% of the average width of all columns of touch units, are maintained, so that when a user use a finger to perform touch operations, the finger will span less touch units at the same time. In this way, when the touch panel is in a low groundmass condition, when the user's finger touches one column of touch units, the charge flowing to other columns of touch units through the finger will be less. Therefore, the retransmission effect will be weakened, and the touch performance will be improved.

In some embodiments, the touch panel 100 may further include a dummy electrode pattern 17 disposed between the two columns of touch units 10 adjacent to each other in the second direction in the plurality of columns of touch units 10, and the dummy electrode pattern 17 is electrically insulated from the first electrode pattern 11 and the second electrode pattern 12. The dummy electrode pattern 17 may be in a floating state, that is, the dunny electrode pattern 17 is not connected to each electrode pattern (for example, first electrode pattern 11, second electrode pattern 12, third electrode pattern 13, fourth electrode pattern 14, first electrode connection portion 23, second electrode connection portion 32 and third electrode connection portion 33) and power signal terminals (such as VDD, VSS, etc.). The dummy electrode pattern 17 is arranged between two adjacent columns of touch units 10, which can improve the uniformity of the optical transmittance of the touch panel. Since the above touch unit 10 is provided with electrode patterns (e.g., first electrode pattern 11, second electrode pattern 12, third electrode pattern 13, fourth electrode pattern 14, first electrode connection portion 23, second electrode connection portion 32, and third electrode connection portion 33), it will have a certain influence on the optical transmittance of the touch panel. Therefore, if no electrode layer is provided between two adjacent columns of touch units 10, the optical transmittance of the touch panel at the position where the touch unit 10 is located will be low, and the optical transmittance of the touch panel at the position between two adjacent columns of touch units 10 is high. This will cause the optical transmittance of the touch panel to be uneven overall. After the dummy electrode pattern 17 is provided between the two adjacent columns of touch units 10, the optical transmittance of the touch panel at the position between the adjacent two rows of touch units 10 is similarly reduced, thereby the optical transmittance of the touch panel is relatively uniform as a whole. This is very helpful for the uniformity of display brightness. In the embodiments of the present disclosure, these electrode pattern structures such as first electrode pattern 11, second electrode pattern 12, third electrode pattern 13, fourth electrode pattern 14, fifth electrode pattern 15, sixth electrode pattern 16, first electrode connection portion 23, second electrode connection portion 32, third electrode connection portion 33, and dummy electrode pattern 17 may be formed of a metal material, or may be formed of a non-metallic material such as tin indium oxide.

In some embodiments, the width of the dummy electrode pattern 17 in the second direction is greater than 30% of the average width of all the touch units in the plurality of columns of touch units along the second direction, for example, between 30% and 50% of the average width of the touch unit along the second direction in all columns of touch units of the plurality of columns of touch units. This can ensure that there is a sufficiently large separation between the touch units of adjacent columns, so that when a user's finger touches the control panel, the fewer columns of touch units are simultaneously bridged, thereby suppressing the retransmission effect.

In some embodiments, the first electrode pattern 11, the second electrode pattern 12, and the dummy electrode pattern 17 may be made of the same material and arranged in the same layer. For example, first electrode pattern 11, the second electrode pattern 12, the third electrode pattern 13, the fourth electrode pattern 14, the fifth electrode pattern 15, the sixth electrode pattern 16, the first electrode connection portion 23, the second electrode connection portion 32, and the third electrode connection portion 33 can be made of the same material as the dummy electrode pattern 17 and arranged in the same layer as the dummy electrode pattern 17. In FIG. 3, an example in which the dummy electrode pattern 17 and the first electrode connection portion 23, the fifth electrode pattern 15, and the sixth electrode pattern 16 are arranged in the same layer is shown. The above arrangement can simplify the process and save costs.

In some embodiments, the touch panel 100 may further include a circular polarizer 36 and a cover 37. As shown in FIG. 3, the circular polarizer 36 is located on the side of the first electrode pattern 11 facing the touch surface 34, and the cover plate 37 is located on the side of the circular polarizer 36 away from the first electrode pattern 11. For example, the outside surface of the cover 37 can be used to form the touch surface 34. A second insulating layer 38 may be provided between the circular polarizer 36 and the pattern layers such as the first electrode pattern 11, the second electrode pattern 12, the third electrode patterns 13, the fourth electrode patterns 14, the fifth electrode patterns 15, the sixth electrode patterns 16, the first electrode connection portion 23, the second electrode connection portion 32 and the third electrode connection portion 33 and the like. The second insulating layer 38 may be used to achieve insulation between the various electrode patterns.

Figure 6:
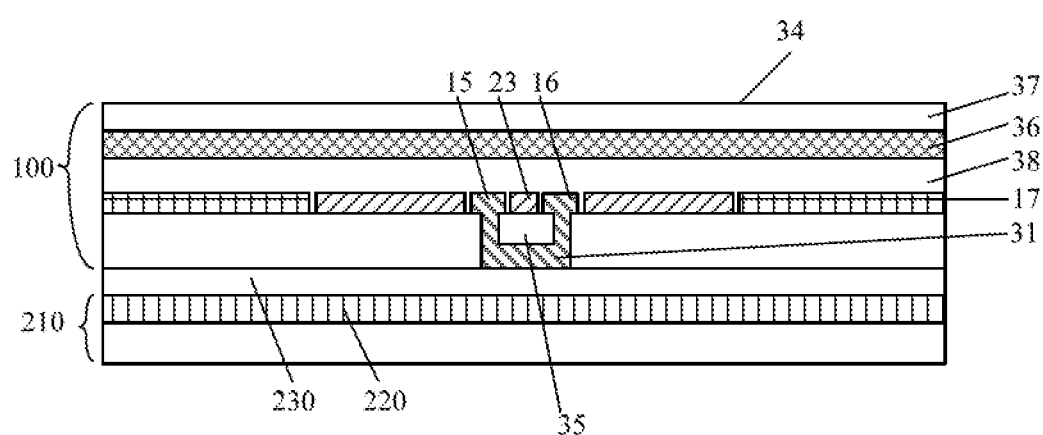
FIG. 6 schematically shows a schematic cross-sectional view of a display device according to an embodiment of the present disclosure.

The electrode patterns in FIGS. 1 and 2 that are not electrically connected to each other are insulated. The solid lines in FIGS. 1 and 2 indicate the boundaries of different electrode patterns. The patterns on both sides of the boundary are actually insulated from each other through the insulating layers (such as the mentioned second insulating layer 38), such as first electrode pattern 11 and second electrode pattern 12, third electrode pattern 13 and fourth electrode pattern 14, third electrode pattern 13 and first electrode connection portion 23, first electrode pattern 11 and first electrode connection portion 23, second electrode pattern 12 and second electrode connection portion 32, fourth electrode pattern 14 and third electrode connection portion 33, fifth electrode pattern 15 and first electrode connection portion 23, sixth electrode pattern 16 and first electrode connection portion 23, and dummy electrode pattern 17 and other patterns can be separated by the insulating layer (for example, see FIG. 6).

The embodiments of the present disclosure also provide a display device 200. The display device 200 may include the touch panel 100 described in any of the above embodiments and the display screen 210. The display screen 210 is located on the side of the touch panel 100 away from the touch surface 34. In some embodiments, the display screen 210 is a light-emitting diode display screen. The display screen 210 is provided with a thin film encapsulation (FE) 220 on the side facing the touch panel 100. The display device 200 may further include a buffer layer 230 between the display screen 210 and the touch panel 100. As an example, each film layer of the touch panel 100 may be formed on the thin film package 220 or the buffer layer 230 without using an adhesive to bond the touch panel and the display screen.

In some embodiments, the display screen 210 includes a plurality of display pixels 40 for displaying images. As mentioned above, the electrode pattern layer on the touch panel 100 (such as first electrode pattern and second electrode pattern, etc.) will have an effect on the optical transmittance of the touch panel. Therefore, In order for the electrode pattern layer to have a substantially uniform effect on the display brightness of each display pixel 40 on the display screen 210, a correspondence relationship between the size of each display pixel 40 on the display screen 210 and the electrode pattern layer on the touch panel 100 can be established. For example, the widths of the first electrode pattern 11 and the second electrode pattern 12 in the second direction are both integer multiples of the width of the display pixels 40 of the display screen 210 in the second direction. In this case, the first electrode pattern 11 and the second electrode pattern 12 can cover exactly the complete display pixels 40 when they are arranged, instead of covering only a part of the display pixels 40, so that the electrode patterns cover the respective display pixels 40 uniformly. Although the above takes first electrode pattern 11 and second electrode pattern 12 as examples, it should be understood that in some embodiments, width of various electrode patterns (e.g. first electrode pattern 11, second electrode pattern 12, third electrode patterns 13, fourth electrode patterns 14. The fifth electrode pattern 15, the sixth electrode pattern 16, the first electrode connection portion 23, the second electrode connection portion 32, the third electrode connection portion 33, and the dummy electrode pattern 17 etc.) can be an integer multiple of the width of the display pixels 40 of the display screen 210 in the second direction. In this way, each display pixel 40 on the display screen 210 can be covered as uniformly as possible, thereby ensuring the uniformity of the brightness of the light emitted from each display pixel 40 of the display screen 210 from the touch panel 100.

Figure 7:
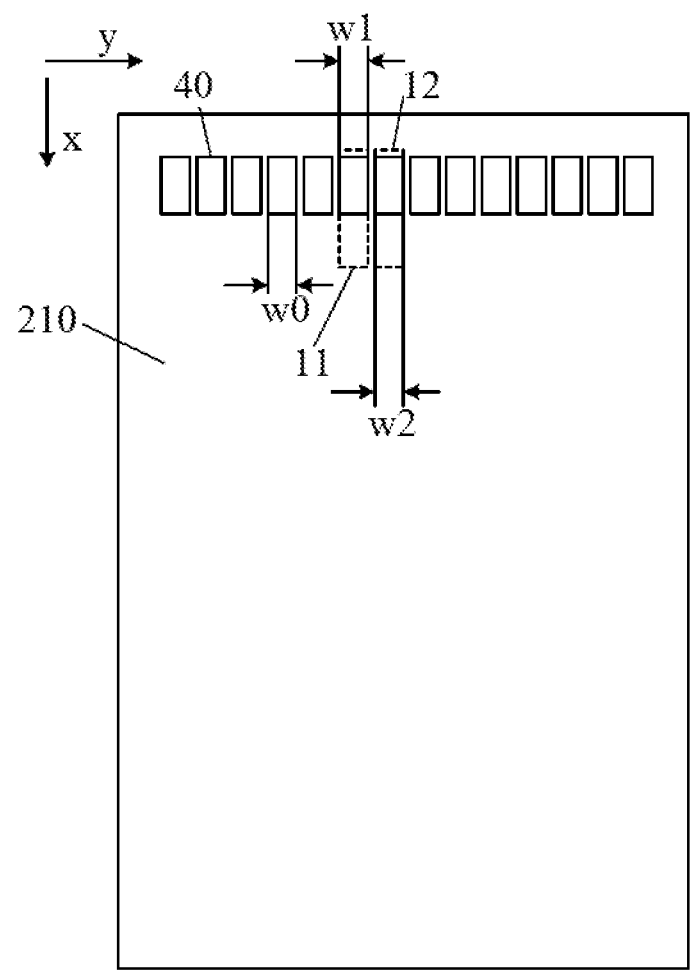
FIG. 7 schematically shows an example where a correspondence relationship between display pixels of a display screen and traces of electrode patterns on a touch panel in a display device according to an embodiment of the present disclosure.

In some embodiments, as shown in FIG. 7, the width w1 of the first electrode pattern 11 in the second direction and the width w2 of the second electrode pattern 12 in the second direction are both equal to the width w0 of the display pixels 40 of the display screen 210 in the second direction. For the case where the first set of first strip sections 111 in the first electrode pattern 11 is offset compared to the second set of first strip sections 111, the offset amount may be, for example, the width of half of a display pixel 40, and the width of the display pixel 40 is, for example, 20 microns to 50 microns. FIG. 7 only schematically shows the pixels 40 on the display screen 210, and shows the outlines of the first electrode pattern 11 and the second electrode pattern 12 corresponding to the pixels 40 with dotted lines. In some embodiments, the width of various electrode patterns (e.g., first electrode pattern 11, second electrode pattern 12, third electrode pattern 13, fourth electrode pattern 14, fifth electrode pattern 15, sixth electrode pattern 16, first electrode connection portion 23, second electrode connection portion 32, third electrode connection portion 33, and dummy electrode pattern 17 etc.) in the second direction may be equal to the width of the display pixel 40 of the display screen 210 in the second direction. However, the embodiments of the present disclosure are not limited to this, for example, various electrode patterns on the touch panel may have other widths, and the partial offset in the electrode patterns may not be equal to the width of half of the display pixels 40, for example, may be the width of the entire display pixel 40 or other numeric value.

The touch unit 10 in the touch panel 100 according to the embodiment of the present disclosure can be used for generalized design, and can be used for working with various integrated circuits. The touch panel according to the embodiments of the present disclosure can easily apply FMLOC technology, and is particularly suitable for a thin and light display device.

The touch panel according to the embodiments of the present disclosure may be used in various display devices, such as OLED (organic light emitting diode), QLED (quantum dot light emitting diode), ULED (multiple partition light distribution independent control light emitting diode), etc. Those skilled in the art should understand that the embodiments of the present disclosure are not limited thereto, for example, the technical idea of the present disclosure may also be applied to other types of display devices.

Unless there are technical obstacles or contradictions, the above-mentioned various embodiments of the present application can be freely combined to form additional embodiments, which are all within the protection scope of the present application.

Although the present application has been described with reference to the drawings, the embodiments disclosed in the drawings are intended to exemplify preferred embodiments of the present application, and cannot be understood as a limitation of the present application.

Although the present disclosure has been described with reference to several exemplary embodiments, it should be understood that the terms used are illustrative and exemplary rather than limiting. Since the present disclosure can be embodied in various forms without departing from the spirit or essence of the present disclosure, it should be understood that the above-mentioned embodiments are not limited to any of the foregoing details, but should be widely interpreted within the spirit and scope defined by the appended claims Therefore, all changes and modifications falling within the scope of the claims or their equivalents should be covered by the appended claims.

What is claimed is:

1. A touch panel, comprising:
a plurality of columns of touch units, each column of touch units comprises a plurality of touch units arranged along a first direction, and at least one touch unit in a same column of touch units comprises a plurality of first electrode patterns and a plurality of second electrode patterns arranged in parallel, each of the first electrode patterns and the second electrode patterns has a ribbon shape and extends along the first direction, the plurality of first electrode patterns and the plurality of second electrode patterns are alternately arranged along the second direction, the second direction and the first direction intersect each other, and the first electrode patterns and the second electrode patterns are electrically insulated from each other.

2. The touch panel of claim 1, wherein, in a same touch unit, each first electrode pattern comprises a plurality of first strip sections connected end to end, and each second electrode pattern comprises a plurality of second strip sections connected end to end;
the plurality of first strip sections comprises a first set of first strip sections and a second set of first strip sections, the first set of first strip sections is offset relative to the second set of first strip sections in the second direction, and in a same first electrode pattern, the first set of first strip sections and the second set of first strip sections are alternately arranged along the first direction; and
the plurality of second strip sections comprises a first set of second strip sections and a second set of second strip sections, the first set of second strip sections is offset relative to the second set of second strip sections in the second direction, and in a same second electrode pattern, the first set of second strip sections and the second set of second strip sections are alternately arranged along the first direction.

3. The touch panel of claim 2, wherein, in a same first electrode pattern, an offset amount of the first set of first strip sections relative to the second set of first strip sections in the second direction is a half of an average width of the first strip sections in the first electrode pattern; and/or
in a same second electrode pattern, an offset amount of the first set of second strip sections relative to the second set of second strip sections in the second direction is a half of an average width of the second strip sections in the second electrode pattern.

4. The touch panel of claim 2, wherein, a first touch area and a second touch area arranged along the first direction are provided in the same touch unit, the plurality of first electrode patterns and the plurality of second electrode patterns are located in the first touch area, a plurality of third electrode patterns and a plurality of fourth electrode patterns arranged in parallel are provided in the second touch area, each of the third electrode patterns and the fourth electrode patterns has a ribbon shape and extends along the first direction, the plurality of third electrode patterns and the plurality of fourth electrode patterns are alternately arranged along the second direction, the third electrode patterns and the fourth electrode patterns are electrically insulated from each other, wherein, a first electrode connection portion is provided at a boundary between the first touch area and the second touch area, the first electrode connection portion extends along the second direction and is electrically connected with the plurality of second electrode patterns and the plurality of fourth electrode patterns.

5. The touch panel of claim 4, wherein, the first electrode connection portion is electrically insulated from the plurality of first electrode patterns and the plurality of third electrode patterns.

6. The touch panel of claim 5, wherein, the plurality of columns of touch units comprise a first column of touch units and a second column of touch units adjacent to each other, the first column of touch units comprises one touch unit, the second column of touch units comprises another touch unit, and the one touch unit and the another touch unit are arranged in parallel in the second direction, the first electrode connection portion of the one touch unit is electrically connected to the first electrode connection portion of the another touch unit.

7. The touch panel of claim 5, further comprising a bridge layer located on a side of the first electrode connection portion away from a touch surface of the touch panel, wherein a second electrode connection portion is provided in the first touch area and a third electrode connection portion is provided in the second touch area, the second electrode connection portion is electrically connected to the plurality of first electrode patterns, the third electrode connection portion is electrically connected to the plurality of third electrode patterns, and the second electrode connection portion and the third electrode connection portion in the same touch unit are electrically connected through the bridge layer.

8. The touch panel of claim 7, wherein, the first electrode pattern, the second electrode pattern, the third electrode pattern, the fourth electrode pattern, the first electrode connection portion, the second electrode connection portion and the third electrode connection portion are made of a same material and arranged in a same layer.

9. The touch panel of claim 5, wherein, the plurality of touch units in a same column comprise a first touch unit and a second touch unit adjacent to each other, the second touch area of the first touch unit is adjacent to the first touch area of the second touch unit, the fourth electrode pattern in the first touch units are electrically insulated from the second electrode patterns in the second touch unit.

10. The touch panel of claim 5, wherein, a fourth electrode connection portion is further provided in the first touch area, the fourth electrode connection portion extends along the second direction and electrically connects the plurality of first electrode patterns and the second electrode connection portion together; and
a fifth electrode connection portion is further provided in the second touch area, the fifth electrode connection portion extends along the second direction and electrically connects the plurality of third electrode patterns and the third electrode connection portion together.

11. The touch panel of claim 10, wherein, the plurality of touch units in a same column comprise a first touch unit and a second touch unit adjacent to each other, the second touch area of the first touch unit is adjacent to the first touch area of the second touch unit, the fifth electrode connection portion in the second touch area of the first touch unit is electrically connected to the fourth electrode connection portion in the first touch area of the second touch unit.

12. The touch panel of claim 1, wherein, two columns of touch units adjacent to each other in the second direction in the plurality of columns of touch units are spaced apart from each other.

13. The touch panel of claim 12, wherein, a distance between the adjacent two columns of touch units in the second direction is greater than 30% of an average width of all columns of touch units in the plurality of columns of touch units along the second direction.

14. The touch panel of claim 12, further comprising a dummy electrode pattern disposed between the two columns of touch units adjacent to each other in the second direction in the plurality of columns of touch units, the dummy electrode pattern being electrically insulated from the first electrode patterns and the second electrode patterns.

15. The touch panel of claim 12, wherein, a width of the dummy electrode pattern in the second direction is greater than 30% of an average width of all the columns of touch units in the plurality of columns of touch units along the second direction.

16. The touch panel of claim 14, wherein, the first electrode patterns, the second electrode patterns and the dummy electrode pattern are made of a same material and arranged in a same layer.

17. A display device comprising:
the touch panel of claim 1; and
a display screen located on a side of the touch panel away from a touch surface.

18. The touch panel of claim 17, wherein, widths of each first electrode pattern and each second electrode pattern in the second direction are integer multiple of a width of a display pixel of the display screen in the second direction.

19. The touch panel of claim 17, wherein, widths of each first electrode pattern and each second electrode pattern in the second direction are equal to a width of a display pixel of the display screen in the second direction.

20. The touch panel of claim 17, wherein, the display screen is a light-emitting diode display screen, and a thin film encapsulation is provided on a side of the display screen facing the touch panel, and the display device further comprises a buffer layer between the display screen and the touch panel.

* * * * *